United States Patent
Khan et al.

(10) Patent No.: US 12,525,329 B2
(45) Date of Patent: Jan. 13, 2026

(54) PRECISION-BASED IMMUNO-MOLECULAR AUGMENTATION (PBIMA) COMPUTERIZED SYSTEM, METHOD, AND THERAPEUTIC VACCINE

(71) Applicant: Neo7Bioscience, Inc., Dallas, TX (US)

(72) Inventors: Shamsuddin Sultan Khan, Dhaka zila (BD); John A. Catanzaro, Rockwall, TX (US); Anton Yuryev, Gaithersburg, MD (US)

(73) Assignee: Neo7Bioscience, Inc., Dallas, TX (US)

( * ) Notice: Subject to any disclaimer, the term of this patent is extended or adjusted under 35 U.S.C. 154(b) by 84 days.

(21) Appl. No.: 18/396,506

(22) Filed: Dec. 26, 2023

(65) Prior Publication Data

US 2024/0170121 A1 May 23, 2024
US 2024/0412837 A9 Dec. 12, 2024

Related U.S. Application Data

(63) Continuation-in-part of application No. 17/944,335, filed on Sep. 14, 2022, now Pat. No. 11,887,710.
(Continued)

(51) Int. Cl.
*G16H 20/10* (2018.01)
*C12N 9/22* (2006.01)
(Continued)

(52) U.S. Cl.
CPC .............. *G16H 20/10* (2018.01); *C12N 9/22* (2013.01); *G16B 15/20* (2019.02); *G16B 25/10* (2019.02); *G16H 10/60* (2018.01); *C12N 2310/20* (2017.05)

(58) Field of Classification Search
CPC ........ G16H 20/10; G16H 10/60; G16B 25/10; G16B 15/20; C12N 9/22; C12N 2310/20
(Continued)

(56) References Cited

U.S. PATENT DOCUMENTS 11,887,710 B2 * 1/2024 Khan ..................... G16H 10/40
2017/0037154 A1 * 2/2017 Jung .................. C07K 14/4747
(Continued)

FOREIGN PATENT DOCUMENTS

WO WO-2021188743 A2 * 9/2021 ............. G16B 20/00

*Primary Examiner* — Michael Tomaszewski
(74) *Attorney, Agent, or Firm* — Wiggin and Dana LLP

(57) ABSTRACT

As disclosed herein a precision based immunomolecular augmentation (PBIMA) high specificity patient profiling networked computer system, rapid therapeutic vaccine design method, and personalized vaccine, which utilizes immuno-molecular biopathway HLA affinity mapping and selection prediction ranking tools. This PBIMA approach comprises: Strategic-Selection, Molecular-Mapping, Antigen-Alignment, Receptor-Recognition, and Tactical Technology (SMART). The platform obtains data from a patient's genes and proteins as input. NGS data, including WES, WGS, ctDNA and cfDNA, RNAseq uses as input. PBIMA comprises a gene-protein-cell Cloud-based sequence editing interface to select the high confidence peptides. The PBIMA vaccine is a solution-based multi-purpose vaccine design strategy. PBIMA technology can produce therapeutic vaccines for cancer, autoimmune, neurodegenerative, inflammation-driven disease, and novel pathogen infection treatment. PBIMA therapeutic design is multi-mechanistic and broad-spectrum.

16 Claims, 6 Drawing Sheets

Specification includes a Sequence Listing.

Related U.S. Application Data which is a continuation of application No. PCT/US2021/022858, filed on Mar. 17, 2021.

(60) Provisional application No. 63/029,633, filed on May 25, 2020, provisional application No. 62/992,227, filed on Mar. 20, 2020.

(51) Int. Cl.
*G16B 15/20* (2019.01)
*G16B 25/10* (2019.01)
*G16H 10/60* (2018.01)

(58) Field of Classification Search
USPC ............................................. 705/2–3
See application file for complete search history.

(56) References Cited

U.S. PATENT DOCUMENTS

| | | | |
|---|---|---|---|
| 2017/0290897 A1* | 10/2017 | Mahr | A61P 35/00 |
| 2018/0291083 A1* | 10/2018 | Walz | C07K 14/7051 |
| 2019/0135902 A1* | 5/2019 | Gelfand | A61P 31/12 |
| 2020/0087364 A1* | 3/2020 | Schuster | C07K 14/7051 |
| 2020/0188438 A1* | 6/2020 | Schimmack | A61K 39/0011 |
| 2020/0276289 A1* | 9/2020 | Rubsamen | G16B 40/00 |
| 2024/0412837 A9* | 12/2024 | Khan | G16H 20/10 |

* cited by examiner

PRECISION-BASED IMMUNO-MOLECULAR AUGMENTATION (PBIMA) COMPUTERIZED SYSTEM, METHOD, AND THERAPEUTIC VACCINE

CROSS-REFERENCE TO RELATED APPLICATIONS

This application is a continuation-in-part of Non-provisional application Ser. No. 17/944,335 filed on Sep. 14, 2022, and entitled "PRECISION-BASED IMMUNO-MOLECULAR AUGMENTATION (PBIMA) COMPUTERIZED SYSTEM, METHOD, AND THERAPEUTIC VACCINE," which is a continuation of International Application published under the Patent Cooperation Treaty No. WO 2021/188743 A3, filed on Mar. 17, 2021 and entitled "PRECISION-BASED IMMUNO-MOLECULAR AUGMENTATION (PBIMA) COMPUTERIZED SYSTEM, METHOD AND THERAPEUTIC VACCINE," which claims priority to U.S. Provisional Application No. 62/992,227, filed on Mar. 20, 2020, and titled "Precision-Based Immuno-Molecular Augmentation (PBIMA) and Personalized Edited Sequence Design (PES)," and U.S. Provisional Application No. 63/029,633, filed on May 25, 2020, and titled "Precision-Based Immuno-Molecular Augmentation (PBIMA) and Personalized Edited Sequence Design (PES)," each of which is incorporated herein by reference in its entirety.

REFERENCE TO ELECTRONIC SEQUENCE LISTING

The contents of the electronic sequence listing (1399-001USC2_Sequence_Listing_v1; 22,385 bytes; and Date of Creation: Oct. 26, 2023) is incorporated herein by reference in its entirety.

FIELD OF THE INVENTION

The present invention generally relates to the field of cloud-based biopathway human leukocyte antigen (HLA) affinity mapping and a selection prediction ranking method. In particular, the present invention is directed to precision-based immune-molecular augmentation (PBIM) computerized system, method and therapeutic vaccine.

BACKGROUND

Malignant tumors are associated with high morbidity and mortality rates with a reported 18.1 million new cases of cancer and 9.6 million cancer-related deaths in 2018 (Bray et al., 2018). Importantly, malignant cell transformation links with the accumulation of DNA damage. Over the past years, research has shown that the immune system, specifically T-cells, can respond to neo-antigens that arise due to this DNA damage (Peng et al., 2019). Of note, neo-antigens are proteins whose genes are somatically mutated in patient tumors and expressed in tumor cells (Efremova et al., 2017). These differ from self-antigens, or non-mutated proteins, that overexpresses in tumor cells. As such, neo-antigens are used to direct the immune response towards cancer cells directly, thus minimizing the risk of developing an autoimmune reaction against a patient's healthy tissue (Shujing et al., 2015). On the other hand, self-antigens are used as adjuvants to boost the immune response and increase the immunity's duration, thus minimizing the dose of antigen needed (Guo et al., 2018, Khong et al., 2016). The best self-antigens are the proteins whose expression is upregulated in tumor cells compared to normal cells (Yarchoan et al., 2017).

Studies have shown that the recognition of neo-antigens is an essential driver of the clinical efficacy for standard-of-care cancer immunotherapies, whether via T-cell checkpoint blockade and adoptive T-cell therapy (CAR-T) (Yarchoan et al., 2017, Peng et al., 2019). The relevance of personalized neo-antigens in tumor control and these antigens' biological properties has been extensively studied (Yuryev and Catanzaro, 2019). Crucially, recent technological advances utilizes to identify novel neo-antigens and isolate T-cells that recognize them in individual patients (Yuryev et al., 2019a, Peng et al., 2019). This personalized neo-antigen design can be then employed in clinical interventions (Yuryev et al., 2019b).

Previously, neo-antigens were ignored as cancer immunotherapy targets due to their enormous diversity, as this was a limitation for developing "one fits all" pharmacologic solution. However, the advent of the personalized medicine paradigm that does not fit the "one fits all" pharmacologic solution schema rekindled using neo-antigen vaccines for personalized immunotherapy. This medicine style is changing the landscape of medical practice, but it requires a more sophisticated precision for personalized cancer vaccines (Catanzaro and Dickens, 2019). In recent years, several clinical trials demonstrated that neo-antigens could facilitate response to checkpoint inhibition (Guo et al., 2018), thus dramatically altering our view on the clinical potential of neo-antigens in cancer immunotherapy.

Technological advances, such as whole-genome sequencing, whole cancer exomics, RNA tumor transcriptomics, and proteomics, develop reliable algorithms for epitope prediction. An increasing number of immunotherapeutic options now facilitate personalized cancer therapies directly targeting a patient's tumor (Yuryev and Catanzaro, 2019, Yuryev and Castillos, 2016, Anastasia et al., 2019, Antunes et al., 2018). Integration of artificial intelligence, machine learning, knowledge graph methods, literature correlation/bioinformatics, and biophysical computation enable first-principles precision science to predict personalized neo-antigen design. In fact, the relevance of personalized neo-antigens in tumor control and the antigens' biological properties has been extensively determined in several disease states by many other groups and us. Indeed, the PBIMA technology has directly shown the ability of this technique to target various diseases.

Moreover, designing a PBIMA vaccine using antimicrobial and anti-viral pooled peptides will influence and induce the immune response against the pathogen. Therefore, viruses, bacteria, fungus, parasites, and whatsoever can not enter, replicate, and get involved with actual protein encoding interference so that the infected cells will die quicker. At the same time, these pooled peptides can also control the prevention of an inflammatory crisis in the patient that often leads to a severe inflammation reaction. In these cases, the patients die from extensive inflammatory moieties because of inflammation caused by a novel coronavirus. The PBIMA vaccine is a solution-based vaccine design approach that will address the infectious disease objectively on the knowledge of how the human immune interaction happens, rather than addressing it subjectively as a science of the pathogen. This kind of vaccine will have high specificity with broad activity to various people because of its SMART mechanism of action.

Human history has experienced significant pandemics such as smallpox, cholera, plague, dengue, AIDS, influenza, severe acute respiratory syndrome (SARS), West Nile disease, and tuberculosis. Influenza pandemics were sporadic yet frequent phenomena in the last decades. Each pandemic harmed human life and economic growth. It is an epidemic danger made more apparent by the number of new emerging infectious diseases. The World Health Organization is considering developing a pipeline partnership to design a rapid vaccine to prevent this series of pandemic crises. No platform technology is available yet to create a safe and effective therapeutic vaccine, especially one using pathogen identification (but not limited to bacteria, virus, and fungi) antigens for CD4+/CD8+ cell modulation. Developing this kind of technology is an emerging requirement, and a designed approach for a multi-platform development to create a therapeutic vaccine is needed.

SUMMARY OF THE DISCLOSURE

In an aspect, a precision-based immunomolecular augmentation (PBIMA) computerized method for designing and treating a patient with customized therapeutic peptides or peptide vaccine is described. The method includes receiving, by at least a processor, a data input comprising patient data including one or more of: patient transcriptomics data and patient urine proteomics data. The method further including computing a precision data output, by the at least a processor, of a vaccine composition specific to a patient's profile and configured to elicit an effective therapeutic response against a patient disease. The method further including conducting an immunopeptide synthesis and manufacturing of the vaccine composition, wherein the patient has been diagnosed with and/or is genetically predisposed to one or more diseases comprising: a cancer, an autoimmune disease, a neurodegenerative disease, and/or a pathogenic infectious disease.

In another aspect, a precision-based immunomolecular augmentation (PBIMA) apparatus for designing and treating a patient with customized therapeutic peptides or peptide vaccine is described. The apparatus includes at least a processor and a memory communicatively connected to the at least a processor, the memory containing instructions configuring the at least a processor to receive a data input including patient data including one or more of: patient transcriptomics data and patient urine proteomics data. The memory further containing instructions configuring the at least a processor to compute a precision data output of a vaccine composition specific to a patient's profile and configured to elicit an effective therapeutic response against a patient disease. The memory further containing instructions configuring the at least a processor to conduct an immunopeptide synthesis and manufacturing of the vaccine composition, wherein the patient has been diagnosed with and/or is genetically predisposed to one or more diseases comprising: a cancer, an autoimmune disease, a neurodegenerative disease, and/or a pathogenic infectious disease.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted. Like reference symbols in the various drawings indicate like elements.

DETAILED DESCRIPTION

This application contains a sequence listing, which is submitted electronically via EFS-Web as an XML formatted sequence listing with a file name "sequence listing", creation date of Sep. 13, 2022, and having a size of about 22.0 kilobytes. The sequence listing that is filed concurrently via EFS-Web is part of the specification and is herein incorporated by reference in its entirety.

Figure 1A:
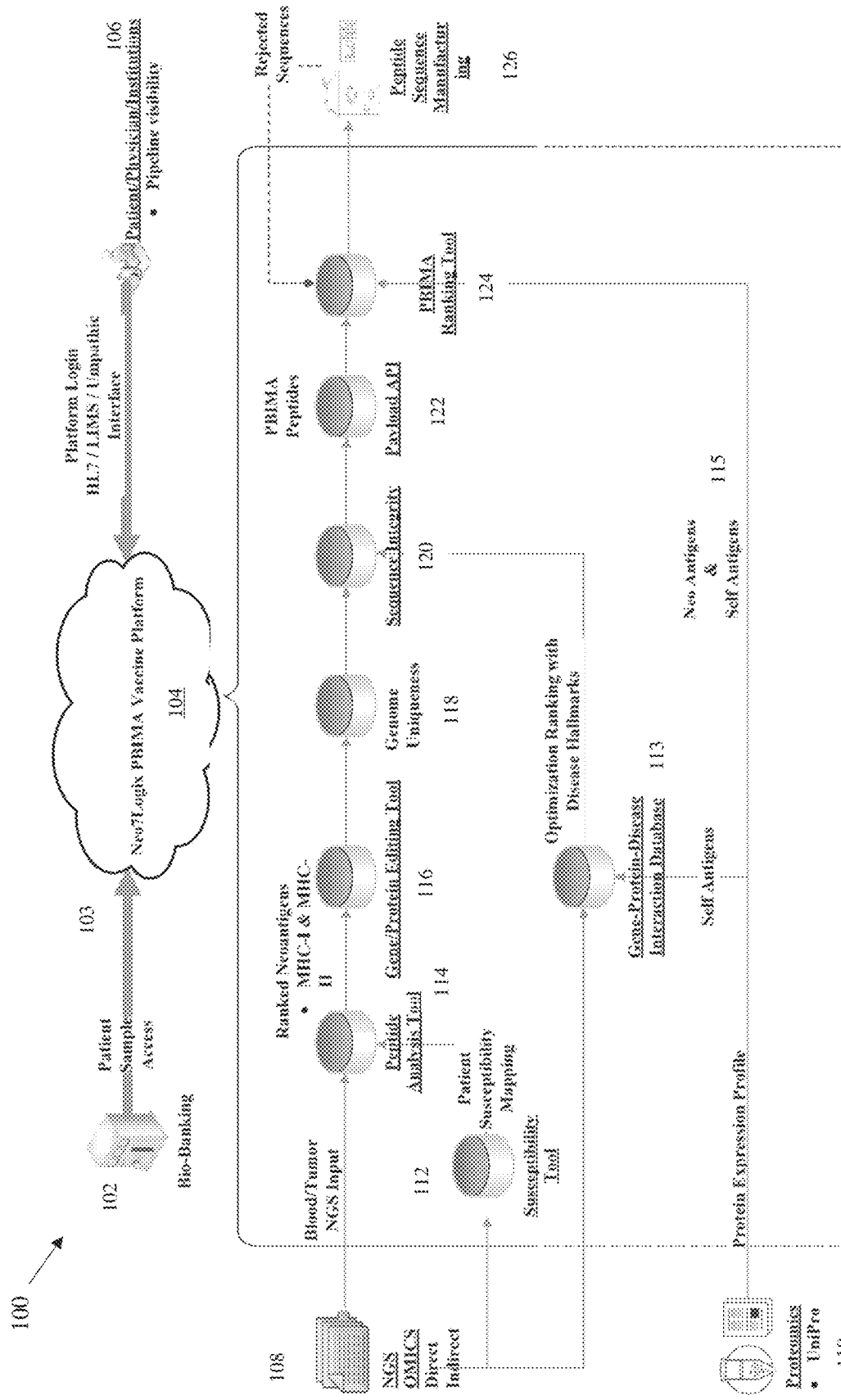
FIG. 1A is a block diagram illustrating an exemplary embodiment of computer system architecture illustrating the PBIMA Cloud-based sequence editing API and treatment method for patient data acquisition using an internet-based system. The computational pipeline is for PBIMA design, immunopeptide synthesis and manufacturing, PBIMA delivery, and administration into patients.

Referring now to FIG. 1A, an exemplary embodiment of precision-based immune-molecular augmentation (PBIMA) computerized system is illustrated. In some embodiments, computerized system may include at least a processor and memory, the memory communicatively connected to the at least a processor. The memory and at least a processor may be further described with respect to FIG. 5. Memory may include instructions configuring the at least a processor to perform various tasks as disclosed throughout this disclosure. System may include a cloud-based computer system. Cloud-based computer system may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Cloud-based computer system may include a single computing device operating independently, or may include two or more computing device operating in concert, in parallel, sequentially or the like; two or more computing devices may be included together in a single computing device or in two or more computing devices. Cloud-based computer system may interface or communicate with one or more additional devices as described below in further detail via a network interface device. Network interface device may be utilized for connecting cloud-based computer system to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Cloud-based computer system may include but is not limited to, for example, a computing device or cluster of computing devices in a first location and a second computing device or cluster of computing devices in a second location. Cloud-based computer system may include one or more computing devices dedicated to data storage, security, distribution of traffic for load balancing, and the like. Cloud-based computer system may distribute one or more computing tasks as described below across a plurality of computing devices of computing device, which may operate in parallel, in series, redundantly, or in any other manner used for distribution of tasks or memory between computing devices. Cloud-based computer system may be implemented using a "shared nothing" architecture in which data is cached at the worker, in an embodiment, this may enable scalability of system 100 and/or computing device.

With continued reference to FIG. 1A, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1A, cloud-based computer system may be designed and/or configured to perform any method, method step, or sequence of method steps in any embodiment described in this disclosure, in any order and with any degree of repetition. For instance, cloud-based computer system may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Cloud-based computer system may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, system may include a quantum computing. In some embodiments, one or more of the computing tasks described in this disclosure may be carried out using a quantum computer. A "quantum computer," for the purposes of this disclosure is a computer that uses quantum mechanical phenomena to perform calculations. Quantum mechanical phenomena are phenomena relating to the behavior of nature at and below the scale of atoms. At small scales, physical matter may exhibit the properties of both particles and waves. Quantum computers may use hardware to leverage quantum superposition, entanglement, and quantum states. Quantum computers may store information in a qubit. A qubit may be described as the basic unit of information for a quantum computer. A qubit may be said to be analogous to the "bit" of traditional computing.

With continued reference to FIG. 1A, a qubit may include two basis states. The qubit may exist in the superposition of these two basis states. A bit of traditional computing can be either "0" or "1". A qubit, however, can exist as a coherent super position of the two basis states. In some embodiments, the measurement of a qubit may irrevocably disturb its superposition state, whereas a traditional bit may be measured without disturbing its state.

With continued reference to FIG. 1A, quantum computers may use quantum parallelism. Quantum parallelism may allow a quantum computer to evaluate a function for multiple input values at once. In some embodiments, this may be accomplished by preparing a quantum system in a superposition of input states. Then, a unitary transformation may be applied to encode the function to be evaluated. The resulting state may encode the functions output values for all input values in the superposition.

With continued reference to FIG. 1A, quantum computer may include a quantum gate array. A quantum gate array decomposes computation into a sequence of few-qubit quantum gates. A quantum computation can be described as a network of quantum logic gates and measurements. However, any measurement can be deferred to the end of quantum computation, though this deferment may come at a computational cost, so most quantum circuits depict a network consisting only of quantum logic gates and no measurements. Quantum gate array may include primitive gates, Toffoli gates, and the like.

With continued reference to FIG. 1A, Precision-Based Immuno-Molecular Augmentation (PBIMA) computerized method, system, and peptide vaccine compositions comprises high specificity patient profiling that requires a Cloud-based API system. This Cloud system utilizes immuno-molecular biological pathways and HLA affinity mapping, prediction and ranking obtained from patient's genomics and proteomics data for personalized cancer vaccine design. As used in this disclosure, a "PBIMA" refers to precision-based Immuno-Molecular Augmentation, which is a patient customized vaccine composition and treatment protocol, comprising an immune sequence design aimed at correcting faults, initiating or regulating pathways as revealed by the patient's own biological data derived from patient tissue, blood, tumor, and or urine samples, that needs correction or enhancement.

With continued reference to FIG. 1A, quantum computer may be applied to predict protein folding. This task seeks to predict how the amino acid sequence of a protein may affect its 3D structure. In some embodiments, this may be accomplished using quantum annealing. Quantum annealing seeks to find the lowest energy path to fold protein sequences and uses probability to approximate the global optimum of a function. Quantum annealing may start the function at a specific temperature value. That temperature value may be decreased at a set interval until the value reaches zero. After each adjustment to the temperature value, an annealing algorithm may make a determination as to whether the system should stay at a state a or transition to a new state A, wherein state A is determined to be probabilistically preferable to state a. This basic process may be repeated until the computer determines that the state has an acceptably low energy. In some embodiments, quantum computer may be used to optimize rotamer. A "rotamer," for the purposes of this disclosure, is any of a number of isomers that can be interconverted by rotation of part of the molecule around a particular bond.

With continued reference to FIG. 1A, as used in this disclosure, terms "including", "comprising" or "having" and variations thereof herein is meant to encompass the items listed thereafter and equivalents thereof, as well as additional items. As used in this disclosure, terms "a" and "an" herein do not denote a limitation of quantity, but rather denote the presence of at least one of the referenced items. Further, as used in this disclosure, terms "first", "second", and "third", and the like, herein do not denote any order, quantity, or importance, but rather are used to distinguish one element from another. As used in this disclosure, the term "about" refers to plus or minus the stated amount.

With continued reference to FIG. 1A, as used in this disclosure, the transitional term "comprising", which is synonymous with "including," "containing," or "characterized by," is inclusive or open-ended and does not exclude additional, unrecited elements or method steps. As used in this disclosure, the transitional phrase "consisting of" excludes any element, step, or ingredient not specified in the claim. As used in this disclosure, the transitional phrase "consisting essentially of" limits the scope of a claim to the specified materials or steps "and those that do not materially affect the basic and novel characteristic(s)" of the claimed invention.

With continued reference to FIG. 1A, as used in this disclosure, the term "about" refers to 5, 6, 7, 8, 9, or 10 percent plus and/or minus the stated amount.

With continued reference to FIG. 1A, as used in this disclosure, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

With continued reference to FIG. 1A, as used in this disclosure, the term "computer-executable code" may include software, firmware, and/or microcode and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

With continued reference to FIG. 1A, as used in this disclosure, the term "Software" or "Computer Program Product" or "Application Program Interface", maybe written or coded using a programming language, and stored using any type of non-transitory computer-readable medium or machine-readable medium well known in the art; and comprises computer program instructions adapted for execution by a hardware element, such as a processor, wherein the instruction comprises commands that when executed cause the processor to perform a corresponding set of commands. The Cloud-based sequence editing API may be written or coded using a programming language and stored using any type of non-transitory computer-readable media or machine-readable media well known in the art. Examples of Cloud-based sequence editing API in the present invention comprise any Database and API components, code, modules, programs, applications, computer programs, application programs, system programs, machine programs, and operating system software.

With continued reference to FIG. 1A, as used in this disclosure, the term "patient profile" as used herein comprises patient characteristics and status, e.g.: a patient's age, gender, disease and stage, genetic and proteomic data input into the platform of the present invention, etc.

With continued reference to FIG. 1A, as used in this disclosure, "PBIMA application" herein refers to the proprietary software run on the networked, computerized system of the present invention, which comprises a cloud-based secured encrypted platform with non-transitory computer-readable storage medium able to receive data input; and then compute the optimal peptides for use in a vaccine composition with self and/or neo-antigens that can elicit an effective therapeutic response (e.g. elicit CD4+/CD8+ cell modulation).

With continued reference to FIG. 1A, as used in this disclosure, the term "system" or "computer system" refers to all the hardware and software involved in conducting the methods disclosed herein, including local and remote computers and cloud based systems comprising: a cloud-based server, the cloud based server comprising one or more of a central processing unit (CPU) or a graphics processing engine (GPU); at least one application programming interface; and at least one online database. In an embodiment, "computer" also refers to any laboratory and/or bioinformatics machine and equipment, etc. well known in the industry, comprising at least one processor or microprocessor for computing and analyzing data that leads to design of the vaccine compositions of the present invention.

With continued reference to FIG. 1A, as used in this disclosure, the term "PBIMA platform" refers to the hardware architecture and associated software framework required to design and produce the customized vaccine compositions disclosed herein; and to computing services that are accessible to one or more client devices, and that are operable to provide access to a plurality of software applications related to the operations of databases of FIG. 1A. And the PBIMA system comprises a computing platform comprising at least one processor and a memory for computing a personalized vaccine composition using the hardware and software, and vendors of FIG. 1A.

With continued reference to FIG. 1A, as used in this disclosure, the term "Payload" refers to an application program interface (API) that will connect the PBIMA pipeline with a Neo7Logix portal to input data, download data and access the pipeline analysis securely. Payload is also a filtered dataset to match the peptides for new design.

With continued reference to FIG. 1A, as used herein, the acronym "SMART" stands for S—strategic selection; M—molecular mapping; A—antigen alignment; R—recognition recognition; and T—tactical technology.

With continued reference to FIG. 1A, PBIMA is a biopathway HLA affinity mapping and selection prediction ranking device that combines biological intelligence programming, termed molecular mapping, applications of knowledge-based systems, artificial intelligence, and machine learning. The platform can utilize all next-generation sequencing (NGS) data, including whole-exome sequencing (WES), whole-genome sequencing (WGS), circulating DNA (ctDNA and cfDNA), NGS transcriptome analysis (RNAseq), and urine proteomics.

With continued reference to FIG. 1A, PBIMA is an In-Silico program that supports the paperless documentation and management of complex distributed processes (e.g., Patient data/peptide design Management). Tools include user interface, backend, requirements capture, and demonstration software (e.g., non-transitory computer-readable storage medium), deployed using AWS (Amazon Web Services™) high-speed processing core i.e., 96 or more but not limited to, and Biovia DS Pipeline 3DS services.

With continued reference to FIG. 1A, in an embodiment, the PBIMA method and system is applicable for cancer, autoimmune, and neurodegenerative diseases. Next, a precision mapping, ranking, and selection profile generates a precision-based personalized immuno-molecular augmentation (PBIMA) to reprogram the immune system to kill malignant cells. Of note, PBIMA, can also predict "best fit" drug therapy and nutritional supplements i.e., natural agents, botanical drugs, bioagent, nutraceuticals for many diseases.

With continued reference to FIG. 1A, PBIMA processes are represented as "On-line mapping, ranking and selection", where "patient/doctors/PBIMA-Admin" communicate online, through the Internet.

With continued reference to FIG. 1A, for each PBIMA role, PBIMA serves as a guide for each part (i.e. Output): 1) identification of self-antigens and neo-antigens for CD4+/CD8+ cell modulation from cancer patient genome; 2) identification of self-antigens and neo-antigens for CD4+/CD8+ cell modulation from a patient with autoimmune disease; and 3) ranking peptides for PBIMA using a combination of patient transcriptomics and proteomics data, literature data, cancer hallmark collection, and manufacture-ability.

With continued reference to FIG. 1A, the PBIMA platform will utilize all next-generation sequencing (NGS) data, including whole-exome sequencing (WES), and whole-genome sequencing (WGS), to design the SOL Vx™ therapeutic vaccine. This technology is a gene-protein-cell communication network editing interface and viral kinetic HTS screening that finds the virus-host to human mutations for real-time surveillance and rapid recognition. The PBIMA platform finds the viral mutations and designs the peptide vaccine for patients, a new vaccine.

With continued reference to FIG. 1A, in this emerging solution for novel pathogens and unknown pathogens, blood samples are collected from a set of infected living patients and infected deceased patients; and whole-exome sequencing (WES) is performed. The data from infected and dead patients is considered as separate cohorts. According to the requirement, the PBIMA system calculates and reads patient output data from WES (as 100× to more than 600× according to requirement). This solution provides high precision for dealing with mutation shifts in a pathogen outbreak. The vaccine treatment also outlines integrative options as treatment alternatives for a pandemic such as Disease-X, an unknown pathogen.

With continued reference to FIG. 1A, the pipeline of FIG. 1A utilizes the PBIMA design approach to determine the existing broad-spectrum anti-viral sequence from the patient sample.

With continued reference to FIG. 1A, the PBIMA method, system, and vaccine compositions of the present invention are suitable for administration to patient's having been diagnosed with or genetically predisposed to various disease states such as: a) Cancers: PBIMA can design all types of cancer vaccine but not limited to Multiple Myeloma, Melanoma, Breast Cancer, Colon Cancer, Lymphoma, Leukemia, Lymphoplasmacytic Lymphoma, Pancreatic Cancer, Lung Cancer, Bladder Cancer, Thyroid Cancer, and Brain Cancers. b) Autoimmune Disease and Inflammation-driven: PBIMA can design all types of Autoimmune and inflammation-driven diseases but not limited to Multiple Sclerosis (MS), Systemic Lupus Erythematosus (SLE), Amyotrophic Lateral Sclerosis (ALS), Scleroderma, Mixed Connective Tissue Disease, Hashimoto's Thyroiditis, Rheumatoid Arthritis, and Autoimmune-Related Inflammation. c) Neurodegenerative Disease: PBIMA can design all types of neurodegenerative diseases vaccine but not limited to Alzheimer's Disease, Parkinson's Disease, Dementia, Brain Inflammatory Disease, CNS Degenerative Inflammation. d) Pathogen related infectious disease including virus, bacteria, fungus, parasites with identified strains, but not limited to COVID-19, Crimean-Congo haemorrhagic fever, Ebola virus disease and Marburg virus disease, Lassa fever, Middle East respiratory syndrome coronavirus (MERS-COV) and Severe Acute Respiratory Syndrome (SARS), Nipah and henipaviral diseases, Rift Valley fever, Zika, "Disease X".

With continued reference to FIG. 1A, peptide sequence may be generated using a large language model. A "large language model" (LLM), as used herein, is a deep learning algorithm that can recognize, summarize, translate, predict and/or generate text and other content based on knowledge gained from massive datasets. Large language model may be trained on large sets of data; for example, training sets may include greater than 1 million words. Training sets may be drawn from diverse sets of data such as, as non-limiting examples, novels, blog posts, articles, emails, and the like. In some embodiments, training sets may include a variety of subject matters, such as, as nonlimiting examples, medical tests, romantic ballads, beat poetry, emails, advertising documents, newspaper articles, and the like. In some embodiments, training sets may be drawn from health blogs, medical websites, Wikipedia, nih.gov, medical journals, the FDA, and the like.

With continued reference to FIG. 1A, in some embodiments, LLM may be generally trained. For the purposes of this disclosure, "generally trained" means that LLM is trained on a general training set comprising a variety of subject matters, data sets, and fields. In some embodiments, LLM may be initially generally trained. In some embodiments, for the purposes of this disclosure, LLM may be specifically trained. For the purposes of this disclosure, "specifically trained" means that LLM is trained on a specific training set, wherein the specific training set includes data including specific correlations for LLM to learn. As a non-limiting example, LLM may be generally trained on a general training set, then specifically trained on a specific training set. As a non-limiting example, specific training set may include patient data, patient transcriptomics data and/or patient urine proteomics data. In some embodiments, specific training set may include patient data, patient transcriptomics data and/or patient urine proteomics data correlated to peptide sequences. In some embodiments, specific training set may be received from information collected by the web crawlers as disclosed above.

With continued reference to FIG. 1A, LLM, in some embodiments, may include Generative Pretrained Transformer (GPT), GPT-2, GPT-3, GPT-4, and the like. GPT, GPT-2, GPT-3, and GPT-4 are products of Open AI Inc., of San Francisco, CA. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like. LLM may include an encoder component and a decoder component.

Still referring to FIG. 1A, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1A, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1A, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1A, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1A, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1A, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1A, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1A, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1A, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1A, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

With continued reference to FIG. 1A, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1A, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With continued reference to FIG. 1A, decoder may take this output and add it to the decoder inputs. Decoder may continue decoding until a token is predicted. Decoder may stop decoding once it predicts an end token.

With continued reference to FIG. 1A, in some embodiment, decoder may be stacked N layers high, with each layer taking in inputs from the encoder and layers before it. Stacking layers may allow LLM to learn to extract and focus on different combinations of attention from its attention heads.

With continued reference to FIG. 1A, LLM may receive an input. Input may include a string of one or more characters or numbers. For example, input may include one or more words, lab data sentence, a paragraph, a thought, a query, and the like. In some embodiments, input may be received from a user device. In some embodiments, input may include patient data, patient transcriptomics data and/or patient urine proteomics data.

With continued reference to FIG. 1A, LLM may generate output. In some embodiments, LLM may include multiple sets of transformer architecture as described above. Output may include a textual output. A "textual output," for the purposes of this disclosure is an output comprising a string of one or more characters. Textual output may include a peptide sequence as described throughout this disclosure.

With continued reference to FIG. 1A, FIG. 1A is an exemplary Cloud-based sequence editing system architecture of the present invention with one or more PBIMA application program interfaces (APIs) and high speed 96 core or more core Cloud API to carry out the following functions, comprising: bio-banking, patient sample process, platform login with HL7 interface, process status, and Neo7Logix™ PBIMA vaccine design platform.

With continued reference to FIG. 1A, in an exemplary embodiment, the system architecture comprises, for example: 1) a bio-bank 102 storing samples of a patient's blood, tissue, and tumor; 2) the PBIMA platform 104 for logging into the system to input or import patient data and output vaccine sequences; 3) at least one remote computer 106 of a patient, physician, medical institution that can log into the PBIMA platform 104 via a wired and wireless network 103; 4) a Next-Generation Sequencing (NGS) OMICS file processing unit or module 108 for receiving and processing data input from e.g., bio-banking 102 of the patient sample; third party computer 106 with access to import data comprising one or more of—blood whole WES (FIG. 2, 210), tumor WES 220, tumor RNA 230, and urine proteomics 240; 5) a Susceptibility Tool (an open-source database and online API) 112 for generation a patient susceptibility map, which is an HLA alleles set; 6) a Peptide Analysis Tool 114 [e.g. a PBIMA Unification application program interface (API) (Neo7Logix™ Cloud-based integrative API)] for designing and ranking neoantigens of the 9-aminoacid peptides—MHC-I and 12-aminoacid peptides; and MHC-II i.e. small peptide to medium sequence peptides; 7) a Gene-Protein Editing Tool 116 (an open-source database and online API), such as for CRISP editing (see FIG. 3); 8) a Genome Uniqueness Tool 118 (an open-source database and online API), for aligning the uniqueness of the sequence. 9) a Gene-Protein-Disease Interaction Database 113 (an open-source/customized—SMART™ database and online API), 10) a Sequence Integrity (open source database and online API, Peptide physicochemical calculator, Thermofisher™, Dosorio R™ package) for receiving input from database 113 and tool 118, to optimize ranking with disease hallmarks (for target-based design); 11) a Payload API 122 to match the best payloads for delivery for more specific targeted delivery. 12) a PBIMA ranking tool 124 for integrative API) to design and rank neoantigens of the 9-aminoacid peptides—MHC-I, and 12-aminoacid peptides—MHC-II; 13) a peptide sequence manufacturing facility and computer 126 for producing a patient's customized vaccine composition, which if the sequences are rejected (e.g., due to non-potent, non-manufacturable, highly toxic etc), the ranking is recomputed at 124 and remanufactured.

With continued reference to FIG. 1A, peptide sequence manufacturing may include solution phase synthesis (SPS). In some embodiments, immunopeptide synthesis and manufacturing of the vaccine composition may include synthesizing peptides using SPS. For the purposes of this disclosure, "SPS" is a synthesis method in which molecules are coupled together in a solution. SPS may be based on the coupling of single amino acids in solution. The fragment condensation method has been used for the synthesis of long peptides. In this case, short fragments of the required peptide may be first synthesized, then coupled together to form a long peptide. An advantage of SPS for peptide synthesis may be that the intermediate products can be deprotected and purified to give the final desired peptide in high purity. Oxytocin (a neuromodulating nonapeptide and important hormone in sexual reproduction), porcine gastrin releasing peptide (a hormone stimulating secretion of gastric acid in the stomach), and human insulin (an amino acid peptide hormone regulating carbohydrate metabolism in the body) are a few examples of peptide hormones that may be synthesized using SPS. Although SPS can be scaled up in an easy and inexpensive manner, the long reaction time may be disadvantage.

With continued reference to FIG. 1A, peptide sequence manufacturing may include Solid Phase Peptide Synthesis (SPPS). For the purposes of this disclosure, "SPPS" is a method of peptide synthesis that uses successive reactions of amino acid derivatives on a macroscopically insoluble solvent-swollen beaded resin support. In some embodiments, immunopeptide synthesis and manufacturing of the vaccine composition may include synthesizing peptides using SPPS. SPPS may allow for the rapid assembly of a peptide chain through successive reactions of amino acid derivatives on a macroscopically insoluble solvent-swollen beaded resin support. The solid support may consist of small, polymeric resin beads functionalized with reactive groups (such as amine or hydroxyl groups) that link to the nascent peptide chain. Since the peptide may remain covalently attached to the support throughout the synthesis, excess reagents and side products can be removed by washing and filtration. This approach may circumvent the comparatively time-consuming isolation of the product peptide from solution after each reaction step, which would be required when using conventional solution-phase synthesis. The general SPPS procedure may include procedures of one of repeated cycles of alternate N-terminal deprotection and coupling reactions. The resin can be washed between each step. First an amino acid may be coupled to the resin. Subsequently, the amine may be deprotected, and then coupled with the activated carboxyl group of the next amino acid to be added. This cycle may be repeated until the desired sequence has been synthesized. SPPS cycles may also include capping steps which block the ends of unreacted amino acids from reacting. At the end of the synthesis, the crude peptide may be cleaved from the solid support while simultaneously removing all protecting groups using a reagent such as trifluoroacetic acid. The crude peptide can be precipitated from a non-polar solvent like diethyl ether in order to remove organic soluble byproducts. The crude peptide can be purified using reversed-phase HPLC. The purification process, especially of longer peptides can be challenging, because cumulative amounts of numerous minor byproducts, which have properties similar to the desired peptide product, have to be removed. For this reason, so-called continuous chromatography processes such as MCSGP may be used in commercial settings to maximize the yield without sacrificing purity.

With continued reference to FIG. 1A, patient sample may include patient cells. For the purposes of this disclosure, "patient cells," are any cells extracted from a patient. Patient cells may include, as non-limiting examples, lymphocytes, neutrophils, monocytes/monophages, and the like. In some embodiments, lymphocytes may include T cells, B cells, or NK cells. In some embodiments, patient cells may include peripheral blood mononuclear cells (PBMCs). For the purposes of this disclosure, "peripheral blood mononuclear cells" are cells that have been isolated from peripheral blood and have a round nucleus. In some embodiments, patient cells may include fibroblasts. For the purposes of this disclosure, a "fibroblast" is a type of cell that contributes to the formation of connective tissue. Fibroblasts may include pericytes, cardiac fibroblasts, muscular fibroblasts, dermal fibroblasts, and the like. In some embodiments, patient cells may be gathered using a biopsy. In some embodiments, patient cells may be gathered using a cytology test.

With continued reference to FIG. 1A, in an embodiment, peptide analysis tool 114 may generate one or more organoids using the patient sample. An "organoid," for the purposes of this disclosure, is a three-dimensional tissue structure that mimics the architecture and functionality of in vivo organs. In some embodiments, organoid may be patient specific. In some embodiments, organoid may be configured to mimic a patient tumor. For the purposes of this disclosure, "patient specific" means created for or tailored for a specific patient. In some embodiments, an organoid may be derived from stem cells. Stem cells," as used in this disclosure, are cells with the potential to develop into many different types of cells in the body. "In vivo," as used in this disclosure, is a process performed or taking place inside a living organism. Organoid may be derived from pluripotent stem cells as describe further below, adult tissue stem cells, embryonic stem cells (hESCs), induced pluripotent stem cells (hIPSCs), and the like.

With continued reference to FIG. 1A, generating one or more organoids may include generating one or more organoids using bioprinting. "Bioprinting," as used in this disclosure is the utilization of 3D printing-like techniques to combine cells, growth factors, and/or biomaterials—to fabricate biomedical parts. Bioprinting an organoid may include pre-bioprinting, bioprinting, and post-bioprinting. "Pre-bioprinting," as used in this disclosure is the process of creating a model that a printer will later create and choosing the materials that will be used. This may include a biopsy of an organ. "Post-bioprinting," as used in this disclosure, is the process of creating a stable structure from biological material. To maintain structure, both mechanical and chemical stimulations may be used. Stimulations may send signals to the cells to control the remodeling and growth of tissues in the organoid. Methods of bioprinting may include direct printing, coaxial extrusion, indirect, laser, droplet and the like.

Still referring to FIG. 1A, bioprinting may be performed without limitation by and/or using an additive manufacturing device. Additive manufacturing devices may include without limitation any device designed or configured to produce a component, organoid, human organoid, human organoid replica, product, or the like using an additive manufacturing process, in which material is deposited on the workpiece to be turned into the finished result. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process.

With continued reference to FIG. 1A, additive manufacturing may alternatively create an element having biological elements, such as an organoid, human organoid, human organoid replica, by printing a support structure having a desired form, followed by deposition of living cells, tissues, or the like thereon. Support structure may be formed of any organic or inorganic material. As a non-limiting example, where organoid, human organoid, human organoid replica is intended to simulate the female reproductive system and/or any portion and/or organ thereof, a support structure may be used to replicate the form and/or structural attributes of pelvic bones, muscular and/or connective tissues surrounding and/or supporting such female reproductive system and/or portion and/or organ thereof, and/or additional portions of the female reproductive system the simulation of which is not necessary for a given application of methods and/or systems described herein. Construction of organoid, human organoid, human organoid replica may alternatively or additional involve use of additive manufacturing to construct a structural support, followed by a non-bioprinting application of biological materials, cell cultures or the like. Additive manufacturing and/or coating processes may alternatively or additionally be used to attach a growth medium, growth matrix, and/or layer of nutrients onto a substrate and/or support structure.

With continued reference to FIG. 1A, generating organoid may include using directed differentiation of human pluripotent stem cells (hPSCs), tissue-specific adult stem cells, or iPSCs. In some embodiments, generating an organoid may include embedding pluripotent cells into an extracellular matrix. Extracellular matrix may include MATRIGEL. When generating organoids with hPSCs, pluripotent cells may be initially cultured with a feeder cell population that provides the growth factors needed to maintain stem cell pluripotency. The hPSCs may be allowed to form colonies in multi-well plates before they are enzymatically detached from the wells and feeder population. Researchers may then dissociate and plate the pluripotent colonies on low-attachment 96 well plates. Over 1-2 weeks, the cells may then begin to form embryoid bodies and can be induced towards certain lineages using tissue-specific induction media. Scientists may embed the differentiated embryoid bodies in MATRIGEL droplets and either cryopreserve or continuously culture them for several months using tissue-specific media.

In some embodiments, generating organoid may be carried out using a bioprinter. A "bioprinter", as used in this disclosure, is a manufacturing device that is configured to perform automated manufacturing processes using materials. A manufacturing device may include an additive or a subtractive manufacturing device. For the purposes of this disclosure, an "additive manufacturing device" is any device designed or configured to produce a component, product, or the like using an additive manufacturing process, in which material is deposited on the workpiece or object to be turned into the finished result. An "additive manufacturing process", for the purposes of this disclosure, is a process in which material is added incrementally to a body of material in a series of two or more successive steps. In one or more embodiments, material used in the additive manufacturing process by the bioprinter may be added in the form of a stack of incremental layers, where each layer may represent a cross-section of the object to be formed upon completion of the additive manufacturing process. Each cross-section may, as a non-limiting example, be modeled on a computing device as a cross-section of graphical representation of the object to be formed. For instance, and without limitation, a computer-aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing may also include bodies of material that are a hybrid of other types of manufacturing processes. For example, and without limitation, forging and additive manufacturing, as described above in this disclosure. As an example, and without limitation, a forged body of material may have welded material deposited upon it which then includes an additive manufactured body of material.

Still referring to FIG. 1A, deposition of material in additive manufacturing processes may be accomplished by any suitable means, as understood by one or ordinary skill in the art. For instance, and without limitation, deposition may be accomplished using stereolithography, in which successive layers of polymer material are deposited and then caused to bind with previous layers using a curing process such as curing using ultraviolet light. Additive manufacturing processes may include "three-dimensional (3D) printing" processes that deposit successive layers of power and binder. In one or more embodiments, the powder may include a polymer or ceramic powder, and the binder may cause the powder to adhere, fuse, or otherwise join into a layer of material making up the body of material or product. Additive manufacturing may include metal three-dimensional printing techniques. For instance, and without limitation, additive manufacturing may include laser sintering including direct metal laser sintering (DMLS) or laser powder-bed fusion. Likewise, additive manufacturing may be accomplished by immersion in a solution that deposits layers of material on the body of material by depositing and sintering materials having melting points, such as, for example, metals. For instance, and without limitation, additive manufacturing may include selective laser sintering by applying fluid or paste-like materials in strips or sheets and then curing that material either by cooling, ultraviolet curing, and the like, any combination of the above methods, or any additional methods that involve depositing successive layers or other increments of material. In one or more embodiments, methods of additive manufacturing may include, without limitation, vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods.

With continued reference to FIG. 1A, an organoid may be selected to correspond to a type of tumor of a patient. For example, an organoid may be selected based on a type of tumor. Type of tumor may include breast, bone, prostate, and the like.

With continued reference to FIG. 1A, ranked peptides of peptide analysis tool 114 may be applied to the generated or selected organoid. In some embodiments, peptides may be applied to generated or selected organoid using a delivery system. A "delivery system" is a system through which peptides may be delivered into cells. Delivery system may include liposomes, nanoparticles, and the like.

With continued reference to FIG. 1A, organoids may be monitored for biomarker expression levels. In some embodiments, biomarkers may include immune biomarkers. In some embodiments, biomarkers to be monitored may include oncoproteins.

With continued reference to FIG. 1A, peptide analysis tool 114 may adjust ranked peptides as a function of biomarker expression levels. As a non-limiting example, peptides that cause high expression levels of oncoproteins may be adjusted downwards in the ranking or eliminated. As a non-limiting example, peptides that cause low expression levels of oncoproteins may be adjusted upwards in the ranking.

With continued reference to FIG. 1A. peptide analysis tool 114 may be configured to generate a peptide report. A "peptide report," for the purposes of this disclosure is a report of data concerning peptides. In some embodiments, peptide report may include the ranked peptides along with the biomarker expression levels from the organoid. In some embodiments, ranked peptides in peptide report may be ordered such that peptides that causes high biomarker expression levels may appear first. In some embodiments, ranked peptides in peptide report may be ordered such that peptides that causes low biomarker expression levels may appear first.

With continued reference to FIG. 1A, in an embodiment, one or more PBIMA applications performs the primary computations of the present invention resulting in data input and the vaccine output; but, if the NGS vendor cannot provide VCF Files, then the PBIMA application further comprises a proprietary Unification API processing program to convert or prepare the necessary files for input. The non-transitory computer-readable medium further comprises a PBIMA Unification code to design and rank a plurality of neoantigens of about or exactly 9-amino acid peptides—MHC-I and about or exactly 12-amino acid peptides—MHC-II.

Figure 2:
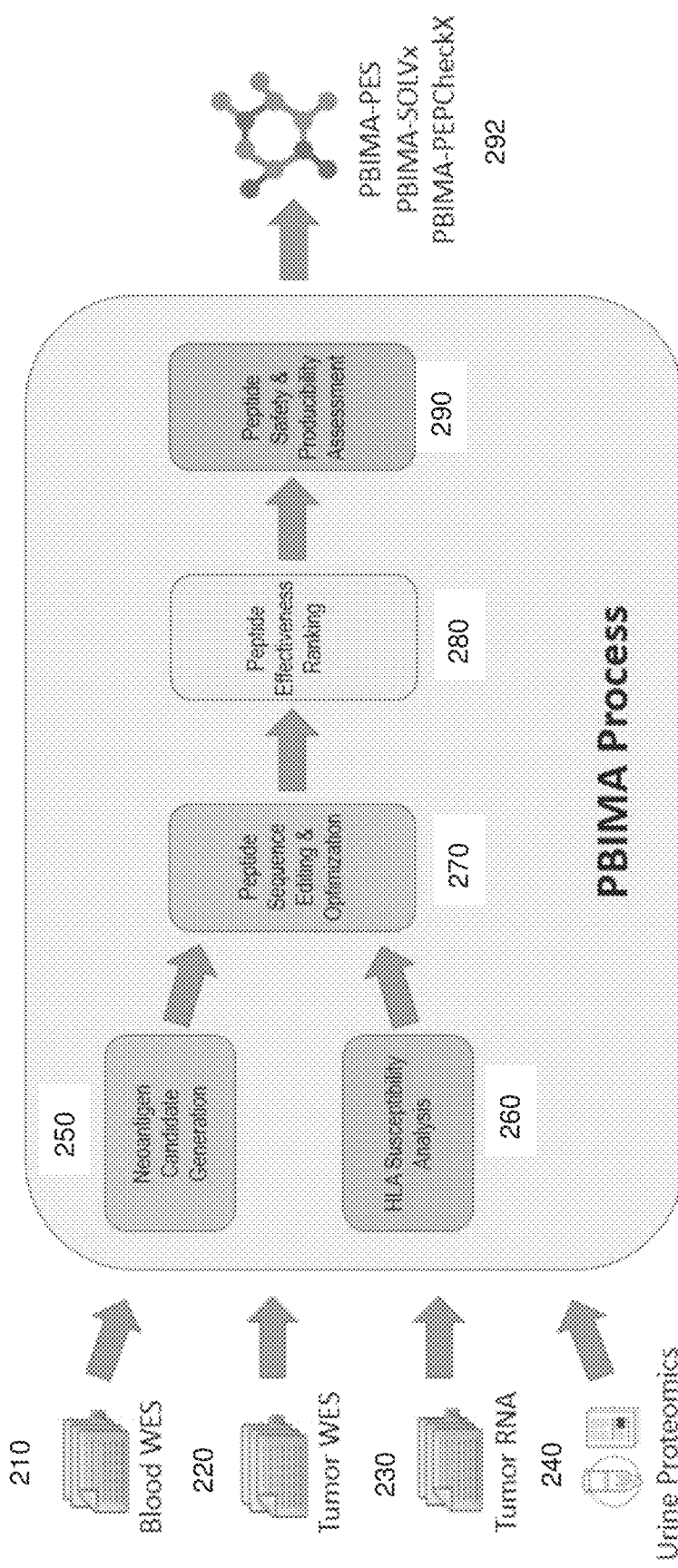
FIG. 2 is a diagram illustrating an exemplary embodiment of a PBIMA design technology consistent with the computational pipeline for PBIMA design.

Now referring to FIG. 2, an exemplary embodiment of a PBIMA design technology consistent with the computational pipeline for PBIMA design is illustrated. A simplified method for inputting a patient's data into the PBIMA platform 292, comprising: blood WES 210; tumor WES 220; tumor RNA 230; and urine proteomics 240. The PBIMA platform then determines the neoantigen candidate generation 250 and the HLA susceptibility analysis 260. This data is then used by the PBIMA platform to edit and optimize (filter and ranking) peptide sequences 270, then rank the peptides according to therapeutic efficacy 280, and produce and evaluate a vaccine comprising the highest ranked peptides 290.

Example: Lung Cancer Patient

Table 1 discloses PBIMA designed neoantigens (proteins) and Immunopeptide sequences for a Lung Cancer patient diagnosed using the computerized system and the present invention method. Final selection of proteins was sorted according to their rank and their peptide with the best affinity towards the patient's MHC1 complexes.

TABLE 1

| Protein | SEQ ID NO: | Sequence |
|---|---|---|
| NCAM1 | 1 | ATGGVSILK |
| PTPN11 | 2 | YINANIIML |
| SEMA5A | 3 | ISYKEIGLW |
| KRT5 | 4 | FSASSGLGL |
| GRIN2B | 5 | ISAQTVTPI |
| CYP2E1 | 6 | RFGPVFTLH* |

*Normal or Light font is good binding affinity, and bold type is weak to no binding affinity
The following criteria accomplish HLA epitope prediction and ranking:
1. Strongest Binding Affinity in one HLA Class
2. Strongest/Med Binding Affinity to identical peptide sequence within multiple HLA classes
3. Binding Affinity Averaging selection based upon the top average
4. Structural considerations for HLA-peptide-T-cell receptor complex assembly
Note:
Immunopeptides were selected based upon the following criteria and not upon HLA binding affinity alone:
1. HLA Affinity Ranking
2. Biological Pathway Ranking
3. Association with Specified Cancer Risk In Population
4. Literature Support
5. Pivotal Molecular Protein to Protein Interactions and Cross Talk (PPI-CT) in Immune Augmentation
6. Antigen Integrity and Sequence Viability (Antigen/Synthesis Analyzer)

Clarification on Ranking: Reds were selected based upon criteria 2-6 and will be noted as self-antigens externally synthesized and introduced as foreign epitopes for specified influences on Immuno-molecular controls on receptor signaling, sensitization, or blockade.

Peptide Pool Manufacturing Criteria
Peptide QC tests for the manufacturer:
 Identity test: MS+HPLC
 Water content test<10%
 Solvent residue test<0.05%
 · Endotoxin test<0.3 IU/mg
Additional Criteria:
Peptide Sequences: On average, there are 10-20 9-amino acid (9 mer) peptides, requiring the following QC tests on them as listed above. Some tests are run on an entire mix (pool) of peptides to decrease the amount of material needed:
Cost Reduction: possible by combing solvent residue analysis with MS or HPLC to reduce cost.
Quantity: 100 mg of each sequence per patient is required.
Logistics: The objective is to reduce the cost of the final product and also meet requirements. Again, to meet logistic expectations of quick TAT, transit, and final packaging with high-quality peptide product.
Nano-Adjuvant Requirements: MF59 and CPG-ODN.

Example—Liver Cancer Patient

Table 2 is a PBIMA designed neoantigens (proteins) and self-antigens (proteins) and Immunopeptide sequences for a liver cancer patient diagnosed with us. Final selection of proteins sorted according to their rank and their peptide with the best affinity towards the patient's MHC1 complexes.

TABLE 2

| Protein | SEQ ID NO: | Sequence* | Antigen type |
|---|---|---|---|
| ARHGEF19 | 7 | SVEMSGDRM | neoantigen |
| CREB1 | 8 | GVPRIEEEE | neoantigen |
| RASAL1 | 9 | NVRLVEGRA | self-antigen |
| STARD13 | 10 | TLDFESNSV | neoantigen |
| SYNE1 | 11 | RSKTPTGLE | self-antigen |
| TRIOBP | 12 | ELDCRDLLG | neoantigen |

*Normal or Light font is good binding affinity, and bold type is weak to no binding affinity The following criteria accomplish HLA epitope prediction and ranking:
1. Strongest Binding Affinity in one HLA Class (immune Epitope Database (IEDB) is a free online resource funded by NIAID, NIH, USA)
2. Synthesis/Purification easiness (Synthesis Analyzer)
3. Solubility (Synthesis Analyzer)

Note: Immunopeptides were Selected Based Upon the Following Criteria and not Upon HLA Binding Affinity Alone:
1. HLA Affinity Ranking—Immune Epitope Database (IEDB) is a free online resource funded by NIAID, NIH USA
2. Biological Pathway Ranking—Gene-Protein-Disease Interaction Database
3. Association with patient cancer risk in population—dbSNP from NCBI, NIH USA
4. Literature Support—Gene-Protein-Disease Interaction Database
5. Pivotal Molecular Protein to Protein Interactions and Cross Talk (PPI-CT) in Immune Augmentation Recommended Peptide QC Tests for the Manufacturer:
 Identity test: MS+HPLC
 Water content test<10%
 Solvent residue test<0.05%
 Endotoxin test 0.3 IU/mg Adjuvants approved for use in humans: Polyinosinic-Polycytidylic Acid Injection, South Land Pharmaceuticals, China
Recommended Nano-Adjuvant previously used in human clinical trials or vaccines: Hiltonol, Adda Vax, Quil-A®
Other similar adjuvants: VAdv-Ly0061

Administration: Recommended maximum dose for each peptide is 1 mg-4 mg/ml dose. Peptides can be pooled together in one immunopeptide pool. Vaccine adjuvant addition is advised for activation of sequences for immune induction and regulation. During the first 3 days of the immunopeptide pool, the patient tolerance dose has to be determined by a gradual increase to the full dose while observing reactivity. An initial test dose of 0.3 mg per peptide should be applied first to determine patient tolerance. After test dose subsequent dosing should be raised 0.25-0.5 mg/ml until top dose is achieved. Titrated dosing can be performed over three days to observe tolerance. When top dose is reached, then administration of the maximum dose continues for 17 consecutive days after that.

Total time of PBIMA administration is 20 days. PBIMA administration can be repeated for 3-4 cycles over 18 months if tumor regression is not observed. Cycles 1-2 can be 6-8 weeks apart and cycles 3-4 can be 12 weeks apart. Cycles 3-4 can be extended for longer than 20 days within the 18-month treatment window. Treatment window and cycling can be adjusted depending upon response to therapy, improvement in clinical signs, symptoms, improved quality of life based upon screening and follow up diagnostic serology, pathology and imaging, as well as, evidence of regression of cancer, tumor, proliferation, metastasis and overall cancer burden.

In case of PBIMA treatment of autoimmune and neurodegenerative disorders, disease regression is measured by reducing related destructive inflammation. It can be confirmed by screening, diagnostic and follow-up criteria, and improved clinical signs, symptoms, and quality of life observed.

Routes of administration: Determination of administration routes is subject to allowances in the physician/healthcare practitioner's scope of practice. By way of non-limiting examples, routes of administration of the vaccines disclosed herein comprise: direct site injection (e.g. into tumor); intramuscular injection; intravenous; oral; buccal; subcutaneous; sub-dermal; intranasal; intratumoral but not limited to parenteral (intravenous, intramuscular, and subcutaneous), oral, nasal, ocular, transmucosal (buccal, vaginal, and rectal), and transdermal.

Example: Progressive CNS Inflammation Autoimmune Disease Patient

Table 3 lists the PBIMA designed neoantigens (proteins) and self-antigens (proteins) and Immunopeptide sequences for a Progressive CNS Inflammation Autoimmune Disease patient diagnosed and treated using the present invention method and system. The final selection of proteins was sorted according to their rank and their peptide with the best affinity towards the patient's MHC-I complexes.

TABLE 3

| SEQ ID NO: | Autoimmune peptide sequences |
|---|---|
| 13 | WSREEQEREE |
| 14 | ADIYTEEAGR |
| 15 | NAPVSIPQ |
| 16 | SALLRSIPA |

Example: Progressive CNS Inflammation Autoimmune Disease Patient

Table 4 lists of PBIMA designed neoantigens (proteins) and self-antigens (proteins), and Immunopeptide sequences for another Progressive CNS Inflammation Autoimmune Disease patient diagnosed and treated using the present invention method and system. The final selection of proteins was sorted according to their rank and their peptide with the best affinity towards the patient's Citrullinated MHC Class-II complexes.

TABLE 4

| SEQ ID NO: | Protein | Sequence |
|---|---|---|
| 17 | MBP-R25 | YLATASTMDHA(cit)HGFLPRHRDTG |
| 18 | MBP-R49 | LDSIGRFFGGD(cit)GAPKRGSGKVP |
| 19 | MBP-R122 | DENPVVHFFKNIVTP(cit)TPPPSQGKGRG |
| 20 | MBP-R130 | PRTPPPSQGKG(cit)GLSLSRFSWGA |
| 21 | MBP-R122/R130 | P(cit)TPPPSQGKG(cit)G |

Progressive CNS Inflammation Autoimmune Disease Patient

Note 14: MBP-R122 9mer fragment of citrullinated sequence portion affinity prediction completed by IEDB and PBIMA Citrullinated Fragment Sequence Location Selection. All sequences are predicted and ranked by Neo7Logix Platform as noted above.

Vaccine Adjuvants: Squalene/Oleic Acid naturally increase IL10. These adjuvants are indicated in autoantigen-related inflammation.

Additional Notes:

Piceatannol (Kershaw and Kim, 2017), can inhibit ADAMTS4. Piceatannol is a metabolite of resveratrol found in red wine, grapes, passion fruit, white tea, and Japanese knotweed (amazon.com).

Integrative IV Design: Two Part IV design should include (12 week Design and Evaluate):

Part 1 (Beginning of week): Low dose dilute Sodium bicarbonate/DMSO/Low Dose Selenium slow intravenous drip (2 hours)

Part 2 (End of the week): Vitamin C (Casava Root) with Regulatory Cytokines (Biological IL-10) with very low dose Dexamethasone slow intravenous drip (2 hours)

Injection Therapy: Glucosamine Sulfate/Boron/Traumeel Injection 2×weekly

Antibiotic Therapy: Low Dose Intermittent Doxycycline/Minocycline to inhibit MMP2/9 neurodegenerative related inflammation (4 weeks on 3 weeks off for 3 cycles) (Rosenberg, 2015; Zhang et al., 2011)

Example: Novel Pathogen Treatment with Exemplary Sequences

Table 5 comprises a plurality of novel polypeptide vaccine sequences for treatment of a virus; and a vaccine composition comprising one or more of sequences of Table 3, wherein the composition may further comprise a pharmaceutically acceptable carrier or diluent.

TABLE 5

| SEQ ID NO | Pathogen Peptide Sequences |
|---|---|
| 22 | KAISFATTL |
| 23 | MAICGMNPI |
| 24 | KTFPPTEPK |
| 25 | YLYALVYFL |

The present invention further comprises one or more of:
a) an isolated polypeptide sequence produced by the present invention system, having at least 70% identity to the sequences provided herein.
b) an isolated polynucleotide (DNA) sequence having at 75%, 80%, 85%, 90%, 95%, or 100% sequence identity to any one of the polypeptide or polynucleotide sequences disclosed herein in Tables 1-3.
c) a host cell comprising polynucleotide sequences encoding any one of the polypeptide sequences produced by the present invention system, and further comprising a promoter suitable for expression of the sequences in vitro or in vivo.
d) one or more isolated polynucleotide sequences encoding any one of the polypeptide sequences produced by the system of the present invention; an isolated nucleic acid molecule, which encodes an amino acid sequence with at least 70% identity to any one of the amino acid sequences provided in the present invention (e.g. Table 5).
e) an isolated polypeptide sequence having at 75%, 80%, 85%, 90%, 95%, or 100% sequence identity to any one of the polypeptide or polynucleotide sequences disclosed herein.
f) a kit comprising one or more of (a-e);
g) an assay comprising one or more of (a-e);
h) an antibody or fragment thereof that specifically binds to one or more polypeptides disclosed herein, and/or produced by the method disclosed herein; and a vaccine comprising the antibody or fragment.
i) an immunogenic composition comprising one or more of (a-h); further comprising a pharmaceutically acceptable: adjuvant, and/or a carrier, and/or a diluent.

j) as claimed herein, all isolated nucleotide, polynucleotide sequences encode complementary DNA, and not genomic DNA.

Figure 1B:
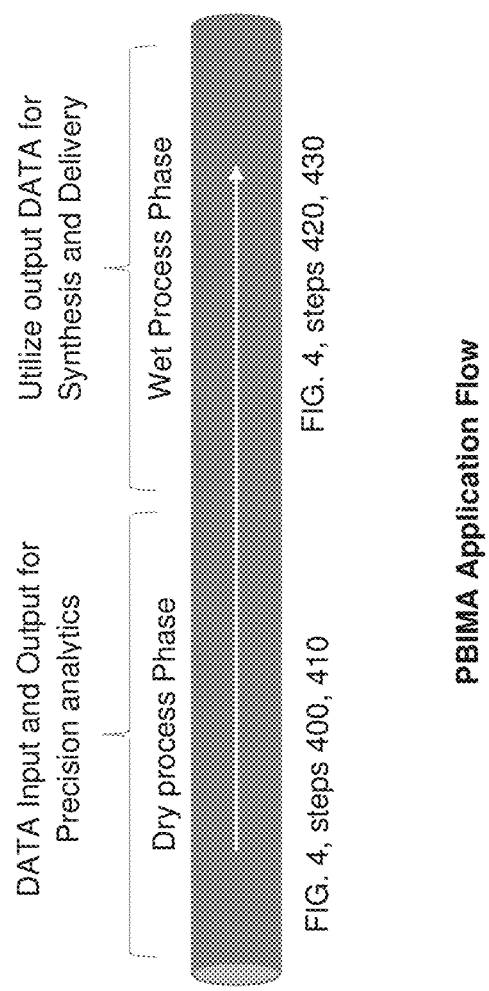
FIG. 1B is a diagram illustrating the PBIMA Application method-input and output.
Figure 3:
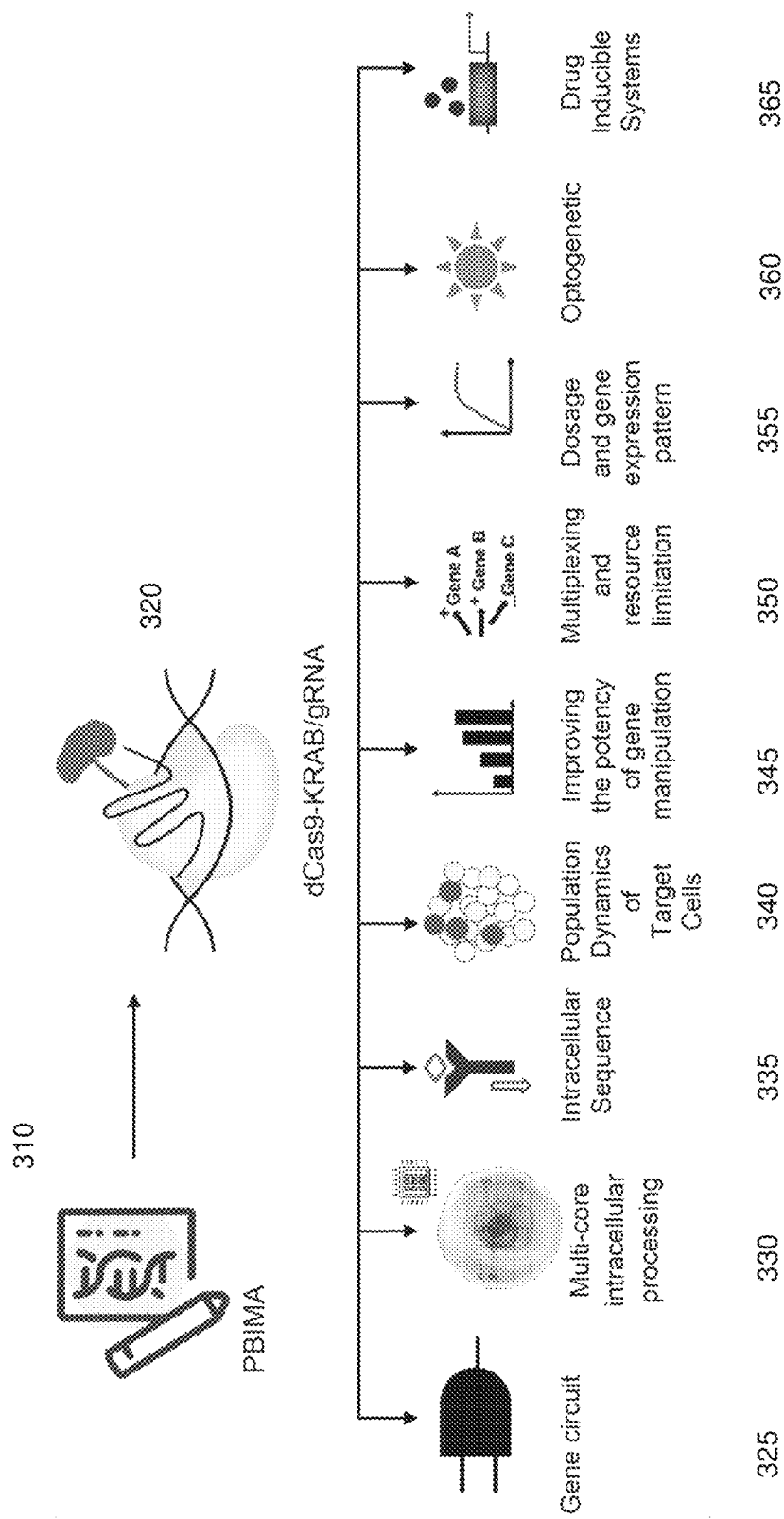
FIG. 3 illustrates a role of a PBIMA integrated CRISPR-cas system in the different biological applications.
Figure 4:
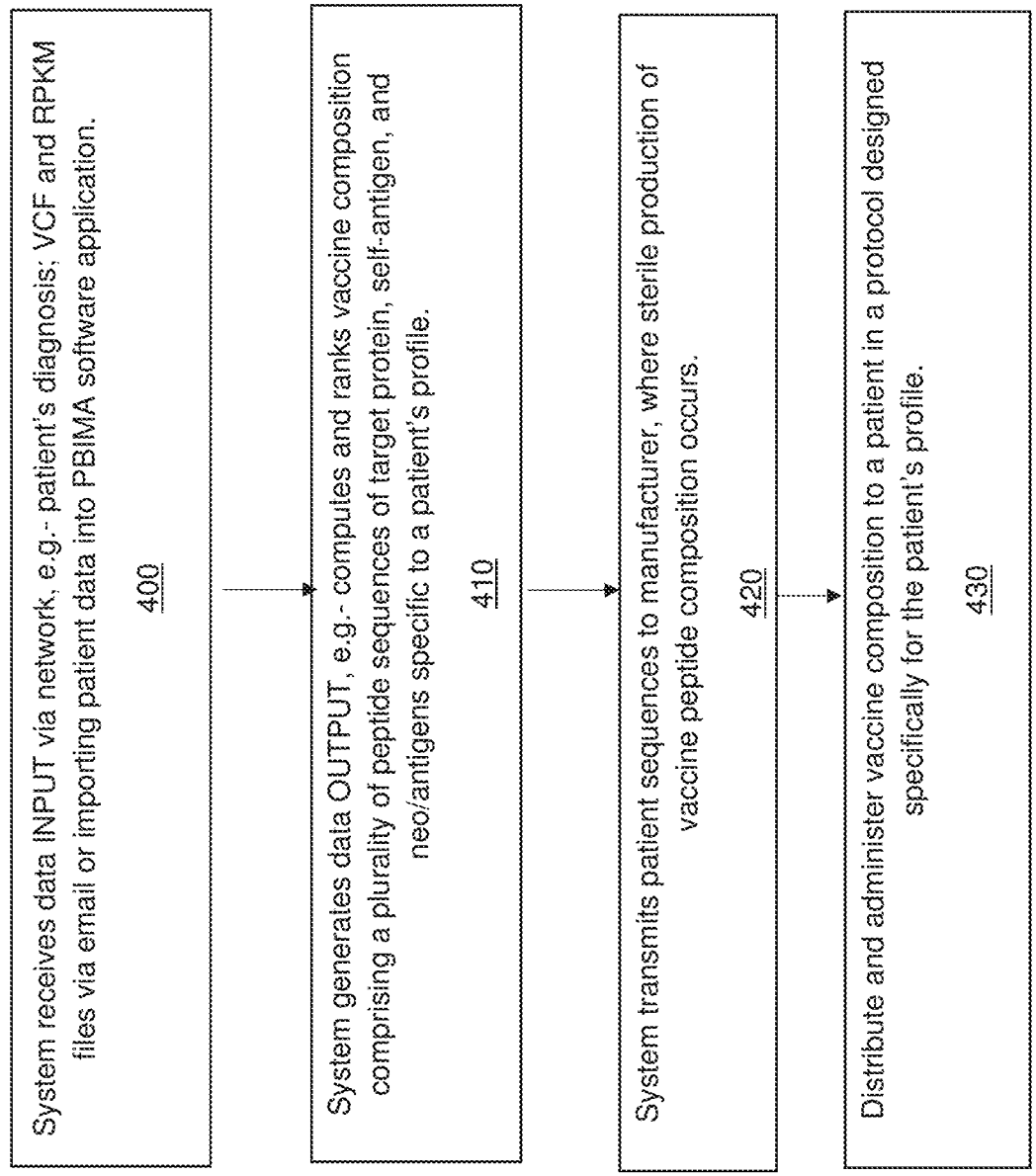
FIG. 4 is a flowchart of the four general steps taken to design a personalized vaccine using the PBIMA networked computer system and software, producing the vaccine, and treating a patient via administering the vaccine.

Now referring to FIG. 4, a flowchart of designing a personalized vaccine using the PBIMA networked computer system and software, producing the vaccine, and treating a patient via administering the vaccine is illustrated. The Personalized Immunotherapy of the present invention is a simple process that individualizes patient treatment to program his/her immune system to fight and regulate against disease. A high-level flowchart of the general steps in carrying out the computer method and system of FIGS. 1A-3. As illustrated in FIG. 1B, the PBIMA computerized Cloud-based sequence editing method comprises two phases, phase 1 is the Dry Lab process, and Phase 2 is the Wet Lab process. In Phase 1, the platform (FIG. 1A) automatically handles input of NGS, WES, RNAseq, and Urine proteomics data into the PBIMA application of the present invention (i.e. non-transitory computer readable storage medium) for neoantigen ranking and selection, which is used to design the personalized edited sequence or peptide or vaccine design data (e.g. see also FIG. 4, steps 400, 410). In phase 2, platform 104 utilizes the output data from phase 1. And in phase 2, the designed data for therapy is transferred to a wet lab for synthesizing the personalized vaccine; and for administration by the patient's clinician (e.g., see also FIG. 4, steps 420, 430).

With continued reference to FIG. 4, the patient's clinician(s) obtains samples from a patient, which requires collecting blood, urine, and tissue; or the use of existing stored tissue in the hospital/NGS vendors. This data is sent to a laboratory by the clinician or the system managers in step 400 where genetic and protein analysis is completed. All data is packaged for precision mapping, which is the second step 410. For example, as illustrated in FIG. 1A, a clinician or lab to which s/he has provided patient samples, imports or uploads a patient's NGS OMICS data 108 comprising VCF files into the PBIMA user interface 104 (e.g., a secure website). The system 100 then computes the ranked neo-antigens using the Susceptibility Tool 112, and the Peptide Analysis Tool 114, which comprises: MHC Class II prediction DB; IEDB; and outputs peptide sequences of about 10-20 amino acids in a TSV file or other file formats. System 100 then performs CRISPR editing 116 on the 10-20 amino acid sequences. As illustrated in the networked computer system FIG. 1A, and the high-level illustration of FIG. 2, the first method step 400 of FIG. 4 is the input of data files into the PBIMA Cloud-based sequence editing API system 100 over the network 103 for the PBIMA application processing. PBIMA Cloud-based sequence editing API system 104 and proprietary API application utilizes the data that is coming from the hospital/physician's lab/vendors, so they do not need to prepare the patient's body samples to process the NGS/WES, RNAseq, urine proteomics steps analysis. NGS providers also deliver fastaq and bam files containing raw sequencing data. The fastaq files are huge and are needed. NGS data is imported into PBIMA Application system first for analysis, then results from PBIMA are used as output for the Phase 2 process. PBIMA uses sequences data and these need to be data cataloged to organize efficiently. A script (command text) takes VCF file with variations found in normal blood and tumor and finds sequences around somatic mutations. This is an input data. PBIMA application needs to input WES data from NGS vendor and what genomics analysis patients will afford to do through their hospital/physicians. The starting point is NGS OMICS Proteomics (Patient Data) flows to Final Design PBIMA Manufacturing and Delivery.

PBIMA application does not require other tools and biological sample processing steps and guidelines as long as NGS vendor provides VCF file. If a NGS vendor cannot provide VCF Files, PBIMA application has its Unification API processing program to convert or prepare the necessary file for input.

With continued reference to FIG. 4, a patient's data is received from testing laboratories and the data is inputted into a sophisticated mapping and selection system (and application, where all data is analyzed and ranked according to the status of a patient's immune defense and regulation and specific to the disease process the patient's body is experiencing. A precision design comprising a vaccine composition comprising a plurality of peptides encoding antigens to stimulate the patient's immune system to fight the disease is then engineered from this analysis called PBIMA. PBIMA is Precision-Based Immuno-Molecular Augmentation, which simply means an immune sequence design aimed at correcting faults, initiating or regulating pathways as revealed by the patient's data that needs correction or enhancement. As further illustrated in FIG. 1A, the PBIMA vaccine platform and a plurality of software further comprise a NGS OMICS file processing unit or module for receiving and processing data input from (Bio-banking of patient samples), (clinician with access to platform 100 via HL7 Interface), computers, e.g.: (Blood & RNA tumor VCF file, WES VCF file from computer); Proteomics data excel file from computer; Peptide Analysis Tool (open-source online Database and API/software) and Susceptibility Tool (open-source online Database and API/software) on computer; Genome Uniqueness Tool (open-source online Database and API/software) on computer; Gene-Protein-Disease Interaction Database (Open source/customized online Database and API) on computer; Sequence Integrity (open-source online Database and API/software, Peptide physicochemical calculator) on computer; and PBIMA Unification data analyzing tools with API (Neo7Logix Cloud-based online Database and API run on the cloud not in a personal computer) to design and rank neoantigens of the 9-amino-acid peptides—MHC-I and 12 or 14-aminoacid peptides—MHC-II (peptides could short to medium 10 to 20) for the manufacturing). In step 410, the Cloud-based computerized system outputs, for example, 1) the identification of self-antigens and neo-antigens for CD8+ cell modulation from cancer patient genome; 2) identification of self-antigens and neo-antigens for CD4+ cell modulation from a patient with autoimmune disease; and 3) ranking peptides for PBIMA using a combination of patient transcriptomics and proteomics data, literature data, cancer hallmark collection, and manufacture-ability.

With continued reference to FIG. 4, upon completion of precision mapping, ranking, and selecting of a patient's data and unique design, then the present invention's PBIMA system packages (means patient's service including the vaccine delivery) the patient's sequences and delivers them to a certified personalized peptide manufacturer (in an Excel file format the final sequences). The peptide manufacturing is completed to cGMP quality (high purity/sterility) and unique to the patient's immune compatibility and programming to correct underlying faults and enhance better immune communication to fight and eradicate the patient's disease.

With continued reference to FIG. 4, the patient's personalized vaccine composition design is delivered to their physician/healthcare practitioner in approximately 6-9 weeks from when the laboratory receives their sample for genetic and protein testing. The patient's vaccine is then mixed with immune activators or adjuvants, administered by injection for 20 days, and maybe repeated for 4 cycles 6-12 weeks apart over 18 months. The patient's physician/healthcare practitioner selects the appropriate administration route and monitors and follows up on their progress, which may require further imaging, blood testing, and other specified markers. The immunopeptides tailored for the patient are enough of a supply to administer for four cycles over 18 months. The peptide pools for the treatment course waiting to be used are stored at −20 to −80 degrees Celsius to keep them viable and well preserved while waiting to receive during the duration of the treatment course. The patient's physician/healthcare practitioner may also decide to integrate additional regenerative modalities, including integrative intravenous therapy, cell therapies, and other effective adjunctive treatments. The present invention further provides a protocol for proper handling and vaccine administration by physicians; and distributing the vaccines internationally safely. FIG. 3 is an illustration of the role of PBIMA integrated CRISPR tool in different biological applications. PBIMA platform 310 integrates CRISPR for more precise target identification and matching. Also, the CRISPR-cas/CRISPR-dcas system is highly productive when accompanied and integrated in PBIMA. It will optimize precision engineering and therapeutic targeting. PBIMA vaccine design is pooled with suitable CRISPR-dcas proteins. dCas proteins delivery along with PBIMA therapeutic design modulates the RNA or DNA functions in the patient. The dCas or Cas system consists of two major classes, six types and 33 subtypes. (e.g. Brezgin, Sergey; Kostyusheva, Anastasiya; Kostyushev, Dmitry; Chulanov, Vladimir. 2019. "Dead Cas Systems: Types, Principles, and Applications" Int. J. Mol. Sci. 20, no. 23: 6041.) In FIG. 3, the PBIMA platform 310 is used in combination with the CRISP system 320 (dCas9-DRAB/gRNA), and comprises: gene circuit 325; multi-core intracellular processing 330; intracellular sequence 335; population dynamics of target cells 340; improving the potency of gene manipulation 345; multiplexing and resource limitation; dosage and gene expression pattern; optogenetic; and inducible drug systems. This list of points comprises the functional activity of the CRISPR-cas system as implemented in the present invention. Delivery of the PBIMA in combination with cas system shows biological efficacy.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
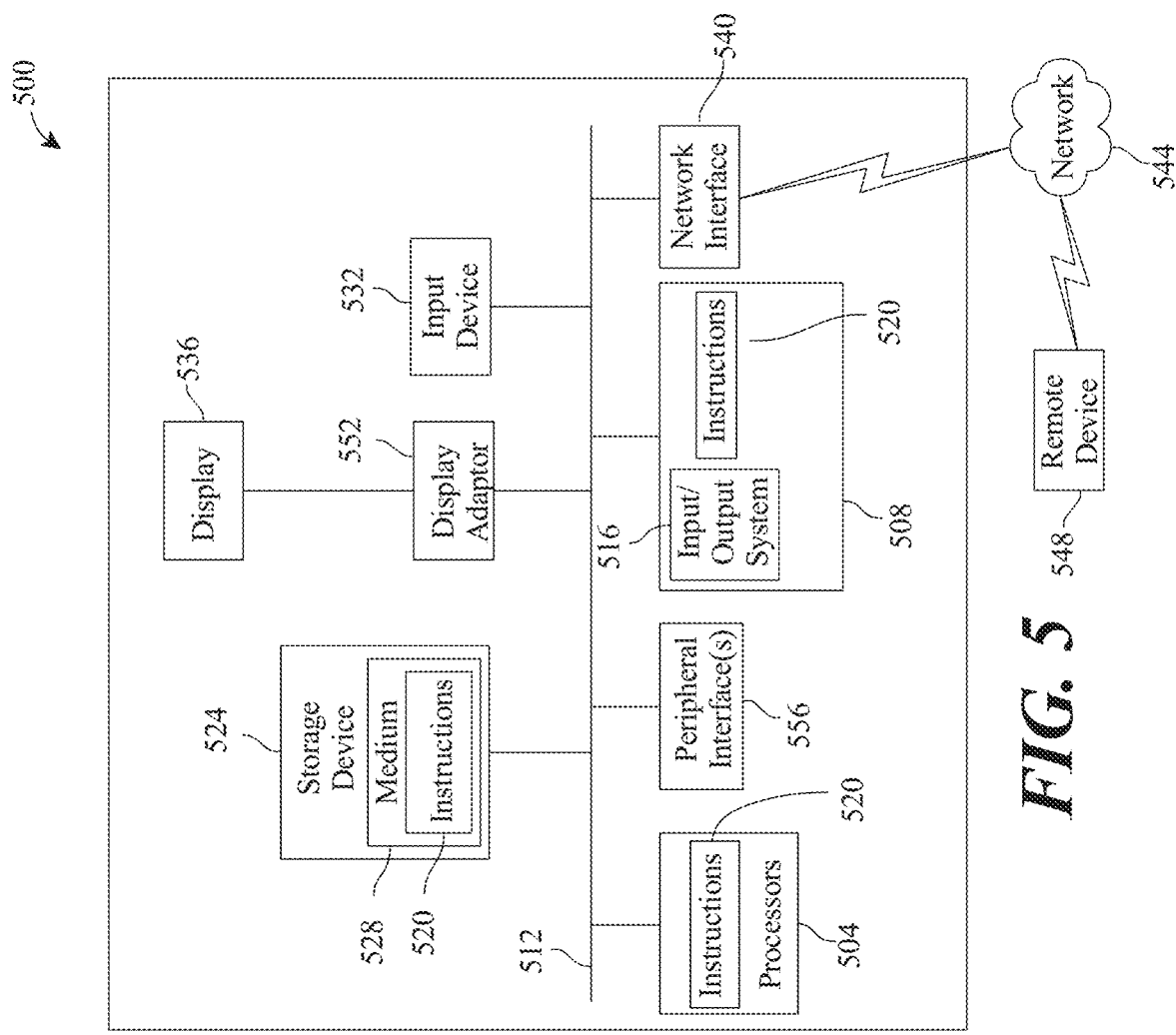
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

```
                          SEQUENCE LISTING

Sequence total quantity: 25
SEQ ID NO: 1            moltype = AA  length = 9
FEATURE                 Location/Qualifiers
source                  1..9
                        mol_type = protein
                        organism = Homo sapiens
SEQUENCE: 1
ATGGVSILK                                                                9

SEQ ID NO: 2            moltype = AA  length = 9
FEATURE                 Location/Qualifiers
source                  1..9
                        mol_type = protein
                        organism = Homo sapiens
SEQUENCE: 2
YINANIIML                                                                9

SEQ ID NO: 3            moltype = AA  length = 9
FEATURE                 Location/Qualifiers
source                  1..9
                        mol_type = protein
                        organism = Homo sapiens
SEQUENCE: 3
ISYKEIGLW                                                                9

SEQ ID NO: 4            moltype = AA  length = 9
FEATURE                 Location/Qualifiers
source                  1..9
                        mol_type = protein
                        organism = Homo sapiens
SEQUENCE: 4
FSASSGLGL                                                                9

SEQ ID NO: 5            moltype = AA  length = 9
FEATURE                 Location/Qualifiers
source                  1..9
                        mol_type = protein
                        organism = Homo sapiens
SEQUENCE: 5
ISAQTVTPI                                                                9

SEQ ID NO: 6            moltype = AA  length = 9
FEATURE                 Location/Qualifiers
source                  1..9
                        mol_type = protein
                        organism = Homo sapiens
SEQUENCE: 6
RFGPVFTLH                                                                9

SEQ ID NO: 7            moltype = AA  length = 9
FEATURE                 Location/Qualifiers
source                  1..9
                        mol_type = protein
                        organism = Homo sapiens
SEQUENCE: 7
SVEMSGDRM                                                                9

SEQ ID NO: 8            moltype = AA  length = 9
FEATURE                 Location/Qualifiers
source                  1..9
                        mol_type = protein
                        organism = Homo sapiens
SEQUENCE: 8
GVPRIEEEE                                                                9

SEQ ID NO: 9            moltype = AA  length = 9
```

-continued

```
FEATURE                 Location/Qualifiers
source                  1..9
                        mol_type = protein
                        organism = Homo sapiens
SEQUENCE: 9
NVRLVEGRA                                                               9

SEQ ID NO: 10           moltype = AA  length = 9
FEATURE                 Location/Qualifiers
source                  1..9
                        mol_type = protein
                        organism = Homo sapiens
SEQUENCE: 10
TLDFESNSV                                                               9

SEQ ID NO: 11           moltype = AA  length = 9
FEATURE                 Location/Qualifiers
source                  1..9
                        mol_type = protein
                        organism = Homo sapiens
SEQUENCE: 11
RSKTPTGLE                                                               9

SEQ ID NO: 12           moltype = AA  length = 9
FEATURE                 Location/Qualifiers
source                  1..9
                        mol_type = protein
                        organism = Homo sapiens
SEQUENCE: 12
ELDCRDLLG                                                               9

SEQ ID NO: 13           moltype = AA  length = 10
FEATURE                 Location/Qualifiers
source                  1..10
                        mol_type = protein
                        organism = Homo sapiens
SEQUENCE: 13
WSREEQEREE                                                             10

SEQ ID NO: 14           moltype = AA  length = 10
FEATURE                 Location/Qualifiers
source                  1..10
                        mol_type = protein
                        organism = Homo sapiens
SEQUENCE: 14
ADIYTEEAGR                                                             10

SEQ ID NO: 15           moltype = AA  length = 8
FEATURE                 Location/Qualifiers
source                  1..8
                        mol_type = protein
                        organism = Homo sapiens
SEQUENCE: 15
NAPVSIPQ                                                                8

SEQ ID NO: 16           moltype = AA  length = 9
FEATURE                 Location/Qualifiers
source                  1..9
                        mol_type = protein
                        organism = Homo sapiens
SEQUENCE: 16
SALLRSIPA                                                               9

SEQ ID NO: 17           moltype = AA  length = 23
FEATURE                 Location/Qualifiers
source                  1..23
                        mol_type = protein
                        organism = Homo sapiens
SEQUENCE: 17
YLATASTMDH ACHGFLPRHR DTG                                              23

SEQ ID NO: 18           moltype = AA  length = 23
FEATURE                 Location/Qualifiers
source                  1..23
                        mol_type = protein
                        organism = Homo sapiens
SEQUENCE: 18
LDSIGRFFGG DCGAPKRGSG KVP                                              23
```

```
SEQ ID NO: 19          moltype = AA  length = 27
FEATURE                Location/Qualifiers
source                 1..27
                       mol_type = protein
                       organism = Homo sapiens
SEQUENCE: 19
DENPVVHFFK NIVTPCTPPP SQGKGRG                                           27

SEQ ID NO: 20          moltype = AA  length = 23
FEATURE                Location/Qualifiers
source                 1..23
                       mol_type = protein
                       organism = Homo sapiens
SEQUENCE: 20
PRTPPPSQGK GCGLSLSRFS WGA                                               23

SEQ ID NO: 21          moltype = AA  length = 13
FEATURE                Location/Qualifiers
source                 1..13
                       mol_type = protein
                       organism = unidentified
SEQUENCE: 21
PCTPPPSQGK GCG                                                          13

SEQ ID NO: 22          moltype = AA  length = 9
FEATURE                Location/Qualifiers
source                 1..9
                       mol_type = protein
                       organism = Homo sapiens
SEQUENCE: 22
KAISFATTL                                                               9

SEQ ID NO: 23          moltype = AA  length = 9
FEATURE                Location/Qualifiers
source                 1..9
                       mol_type = protein
                       organism = Homo sapiens
SEQUENCE: 23
MAICGMNPI                                                               9

SEQ ID NO: 24          moltype = AA  length = 9
FEATURE                Location/Qualifiers
source                 1..9
                       mol_type = protein
                       organism = Homo sapiens
SEQUENCE: 24
KTFPPTEPK                                                               9

SEQ ID NO: 25          moltype = AA  length = 9
FEATURE                Location/Qualifiers
source                 1..9
                       mol_type = protein
                       organism = Homo sapiens
SEQUENCE: 25
YLYALVYFL                                                               9
```

What is claimed is:

1. A precision-based immunomolecular augmentation (PBIMA) computerized method for designing and treating a patient with customized therapeutic peptides or peptide vaccine, comprising:
   receiving, by at least a processor, a data input comprising patient data comprising one or more of patient transcriptomics data and patient urine proteomics data;
   computing a precision data output, by the at least a processor, of a vaccine composition specific to a patient's profile and configured to elicit an effective therapeutic response against a patient disease, the computing comprising,
   identifying a plurality of therapeutic peptide sequences, and
   ranking the plurality of therapeutic peptide sequences as a function of biomarker expression levels of an organoid to use in the vaccine composition; and
   conducting an immunopeptide synthesis and manufacturing of the vaccine composition;
   wherein the patient has been diagnosed with and/or is genetically predisposed to one or more diseases comprising a cancer, an autoimmune disease, a neurodegenerative disease, and/or a pathogenic infectious disease.

2. The PBIMA computerized method of claim 1, further comprising computing a CRISPR prime editing and an intracellular multi-core processing on the vaccine composition to produce a DNA-RNA and epigenetic modulation plurality of immunopeptide sequences.

3. The PBIMA computerized method of claim 2, wherein computing a CRISPR prime editing comprises the integration of PBIMA therapeutic vaccine ranked plurality of peptide sequences.

4. The PBIMA computerized method of claim 1, wherein the vaccine composition comprises a plurality of ranked peptide sequences encoding self-antigens and/or neo-antigens for a CD4+/CD8+natural killer (NK) cell modulation.

5. The PBIMA computerized method of claim 1, wherein the biomarker expression levels comprise an expression level of oncoproteins.

6. The PBIMA computerized method of claim 1, further comprising generating a peptide report, comprising the plurality of therapeutic peptide sequences, as a function of the biomarker expression levels of the organoid.

7. The PBIMA computerized method of claim 1, wherein conducting an immunopeptide synthesis and manufacturing of the vaccine composition comprises synthesizing peptides using solution phase synthesis.

8. The PBIMA computerized method of claim 1, wherein conducting an immunopeptide synthesis and manufacturing of the vaccine composition comprises synthesizing peptides using solid phase peptide synthesis.

9. A precision-based immunomolecular augmentation (PBIMA) apparatus for designing and treating a patient with customized therapeutic peptides or peptide vaccine, comprising:
   at least a processor; and
   a memory communicatively connected to the at least a processor, the memory containing instructions configuring the at least a processor to:
      receive a data input comprising patient data comprising one or more of patient transcriptomics data and patient urine proteomics data;
      compute a precision data output of a vaccine composition specific to a patient's profile and configured to elicit an effective therapeutic response against a patient disease, the computing comprising,
         identifying a plurality of therapeutic peptide sequences, and ranking the plurality of therapeutic peptide sequences as a function of biomarker expression levels of an organoid to use in the vaccine composition; and
      conduct an immunopeptide synthesis and manufacturing of the vaccine composition;
   wherein the patient has been diagnosed with and/or is genetically predisposed to one or more diseases comprising a cancer, an autoimmune disease, a neurodegenerative disease, and/or a pathogenic infectious disease.

10. The PBIMA apparatus of claim 9, wherein the memory contains instructions further configuring the at least a processor to compute a CRISPR prime editing and an intracellular multi-core processing on the vaccine composition to produce a DNA-RNA and epigenetic modulation plurality of immunopeptide sequences.

11. The PBIMA apparatus of claim 10, wherein computing a CRISPR prime editing comprises the integration of PBIMA therapeutic vaccine ranked plurality of peptide sequences.

12. The PBIMA apparatus of claim 9, wherein the vaccine composition comprises a plurality of ranked peptide sequences encoding self-antigens and/or neo-antigens for a CD4+/CD8+ natural killer (NK) cell modulation.

13. The PBIMA apparatus of claim 9, wherein the biomarker expression levels comprise an expression level of oncoproteins.

14. The PBIMA apparatus of claim 9, wherein the memory contains instructions further configuring the at least a processor to generate a peptide report, comprising the plurality of therapeutic peptide sequences, as a function of the biomarker expression levels of the organoid.

15. The PBIMA apparatus of claim 9, wherein conducting an immunopeptide synthesis and manufacturing of the vaccine composition comprises synthesizing peptides using solution phase synthesis.

16. The PBIMA apparatus of claim 9, wherein conducting an immunopeptide synthesis and manufacturing of the vaccine composition comprises synthesizing peptides using solid phase peptide synthesis.

* * * * *